United States Patent [19]

Airhart

[11] Patent Number: 4,719,607

[45] Date of Patent: Jan. 12, 1988

[54] FULL WAVE FIELD VIBRATORY SEISMIC SOURCE

[75] Inventor: Tom P. Airhart, Plano, Tex.

[73] Assignee: Atlantic Richfield Company, Los Angeles, Calif.

[21] Appl. No.: 58,074

[22] Filed: Jun. 4, 1987

Related U.S. Application Data

[62] Division of Ser. No. 792,531, Oct. 29, 1985.

[51] Int. Cl.⁴ .............................................. H04R 23/00
[52] U.S. Cl. ...................................... 367/189; 367/75; 181/113; 181/114; 181/119; 181/121
[58] Field of Search .................. 367/75, 143, 190, 189; 181/113, 114, 119, 121, 139, 142, 401

[56] References Cited

U.S. PATENT DOCUMENTS

| | | | |
|---|---|---|---|
| 4,059,820 | 11/1977 | Turpening | 367/75 |
| 4,354,572 | 10/1982 | Martin | 367/75 |
| 4,421,198 | 12/1983 | Miller | 181/114 |

*Primary Examiner*—Charles T. Jordan
*Assistant Examiner*—John W. Eldred
*Attorney, Agent, or Firm*—Robert M. Betz

[57] ABSTRACT

A vibratory seismic surface source includes a single vibrating mass, the energy of which is coupled to the earth through a ground contacting base plate. Means are provided for varying the inclination and azimuth of the vector path traversed by the reciprocating mass, such that any desired combination of compressional and shear waves, both SH and SV type, may be generated and recorded simultaneously at a point on the earth's surface remote from the source.

3 Claims, 3 Drawing Figures

FULL WAVE FIELD VIBRATORY SEISMIC SOURCE

This is a division of application Ser. No. 06/792,531, filed 10/29/85.

BACKGROUND OF THE INVENTION

1. Field of the Invention

This invention relates generally to the field of seismic exploration and more particularly to an improved method and apparatus for imparting vibrational energy to the earth wherein selected combinations of compressional and shear wave energy can be generated simultaneously.

2. Description of the Prior Art

Recent advances in the ability of seismic data acquisition and processing equipment to handle large amounts of data have stimulated greater interest in the development of versatile high energy seismic sources adapted to produce both compressional and shear waves. One goal in the development of "multi-component" seismic sources is to enable the operator to more efficiently measure sub-surface formation properties such as porosity, fracture orientation, pore fluid type, or lithologic type. It is known that P, SH and SV waves travel with their own distinct velocities when passing through a particular geologic formation. Thus, changes in formation property such as rock type, porosity and the like may be detectable by changes in the full wave field (i.e., the P, SH and SV wave velocities). A strong correlation observed between lateral variations in the compressional to shear wave velocity ratio ($V_p/V_s$) with known changes in the geologic formation suggests that these variations may be used to infer changes in the lithology, porosity, or pore fluid content of a sub-surface formation. By recording the full wave form of a seismic wave, including P, SH and SV waves, one can get far more detailed information concerning rock properties at depth than would otherwise be possible.

There are two major types of surface seismic sources currently available, which have been adapted to the production of combined P and S waves. One is the impulsive type source wherein a heavy mass is propelled in a single downward stroke to impact a ground engaging target. The other is the reciprocating vibratory type transducer which imparts a controlled, varying frequency signal into the earth, as exemplified by the Vibroseis®, (a registered trademark of Conoco, Inc.). It is with the latter type of seismic source that the invention to be described is particularly concerned.

The general concept of simultaneously imparting both compressional and shear wave vibrational energy to the earth with seismic exploration apparatus is taught in U.S. Pat. No. 4,321,981 issued to K. H. Waters on Mar. 30, 1982, entitled "Combination Shear Wave and Compressional Wave Seismic Energy Vibrator". In accordance with the above referenced patent, a combination of two or more vibrating masses may be operated along opposing non-vertical vibrational axes, oriented at a fixed angle to each other in parallel planes. The times of passage of the masses through a common central point as they vibrate along their respective axes can be controlled to establish a phase relation between the two vibratory motions. By varying the related phases of the two masses, one can effect desired inputs of compressional and shear waves simultaneously.

The referenced Waters patent teaches that the parallel planes in which the respective vibration axes of the two masses lie are to be oriented either transversely to the line of seismic survey, i.e., the line between the location of the seismic source and the recording geophones, or along such survey line. With proper phasing, the above referenced transverse axial orientation of the vibrating masses enables one to produce and record simultaneously P waves and shear SH waves. On the other hand, if the vibrational axes are aligned with the survey line, one can generate and record simultaneously P waves and shear SV waves. The vertical component of motion in both cases produces so called "Converted" shear SV waves but such waves cannot be processed aned interpreted with conventional seismic methods. Thus, Waters teaches in effect that only by operating the patented apparatus successively in these two modes can one generate and record at a single remote location all forms of a seismic wave, including P, SH and SV waves, in a manner which permits conventional processing.

The present invention has as its general objective, the teaching of a method and apparatus which is adapted to provide the generation of simultaneous P, SH and SV waves by means of vibrational energy.

In applicant's commonly assigned co-pending U.S. patent application, Ser. No. 772,878, filed Apr. 12, 1985 entitled, "Apparatus for Generating Combined Shear and Compressional Waves in the Earth", which is a continuation in part of application, Ser. No. 504,557, filed June 15, 1983, there is disclosed generally the method of simultaneous recording of the full wave form of a seismic signal, including P, SH and SV waves. The method involves the concept of impacting the earth with a force directed along a slant path inclined at a preselected acute angle with respect to a vertical direction and at an azimuth making a preselected acute angle with respect to a selected seismic line. This force may be resolved into three components directed respectively in a vertical path, and each of two horizontal paths, one being transverse to a given seismic line and the other being directed along such line. Thus, a single force against the earth delivered by a mass accelerated against a ground contacting target, may simultaneously generate P, SH and SV waves, which can be efficiently recorded by means of three orthogonal geophones at a remote location along the given seismic line.

Improved apparatus for directing the force of a surface seismic source along a slant path, such as described in the aforementioned application, Ser. No. 772,878, is set forth in Applicant's further co-pending commonly assigned U.S. patent application, Ser. No. 676762, filed Nov. 3, 1984; and entitled "Mounting and Control Means for Full Wave form Seismic Source". The pertinence of the teaching of the latter application to the present invention lies in the fact that it provides for free rotation of the impacting force path about two mutually perpendicular horizontal axes. Applicant has perceived that this "gimbal" type of support is well suited to the construction of a vibratory motion surface seismic source, with an adjustable vibratory axis.

It is therefore a more particular object of this invention to provide an improved method and apparatus for the simultaneous generation of P, SH and SV waves by means of the vibrational energy of a single vibrating mass.

SUMMARY OF THE INVENTION

In accordance with the present invention, an apparatus is provided wherein the vibrating mass of a surface seismic source may be adjusted so that its vibratory axis is directed along a slant path of any desired inclination to the vertical combined with any azimuthal orientation with respect to a seismic line between the source and a remotely positioned three-axis recorder. More particularly, the apparatus comprises a cylindrical hydraulic vibrator supported above a ground engaging base plate in a gimbal type fixture enabling rotation of the vibrator axis about two mutually perpendicular rotational axes. Hydraulic cylinders extending between the base plate and the vibrator may be operated in tandem so as to achieve any desired orientation of the slant path of the vibrator axis.

Further objects and advantages of this invention will become apparent from a consideration of the following detailed description taking in conjunction with the accompanying drawings.

DETAIL DESCRIPTION OF THE INVENTION

Figure 1:
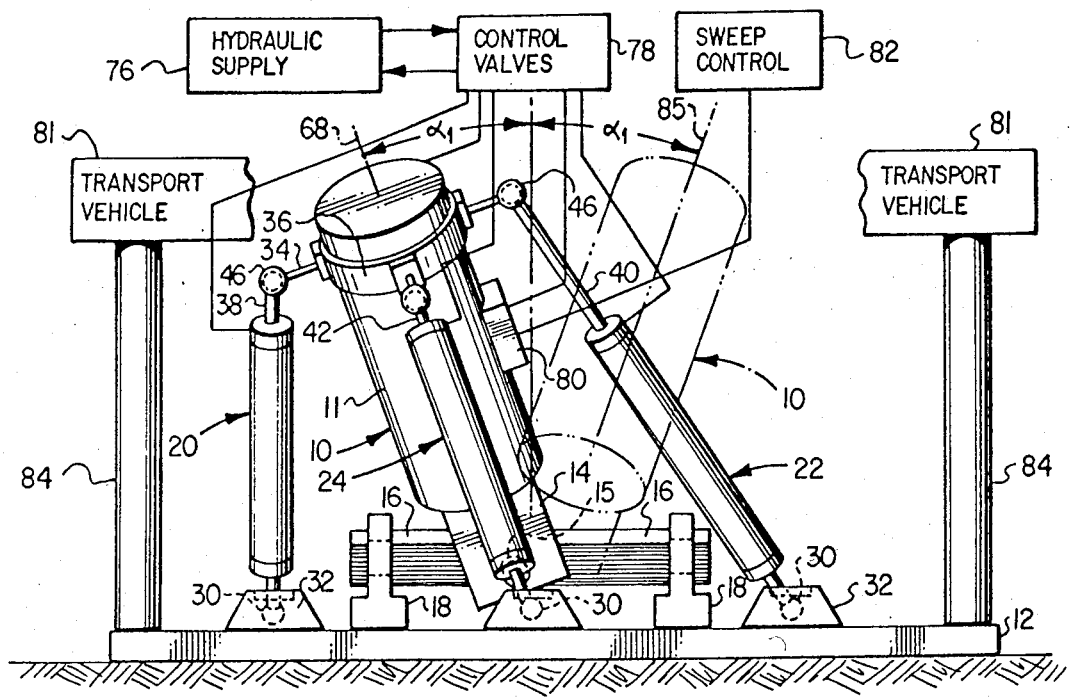
FIG. 1 is a simplified elevational view, partly in block diagramatic form, of an apparatus in accordance with a perferred embodiment of the present invention, illustrating the orientation of the hydraulic vibrator in a non-vertical slant path.
Figure 2:
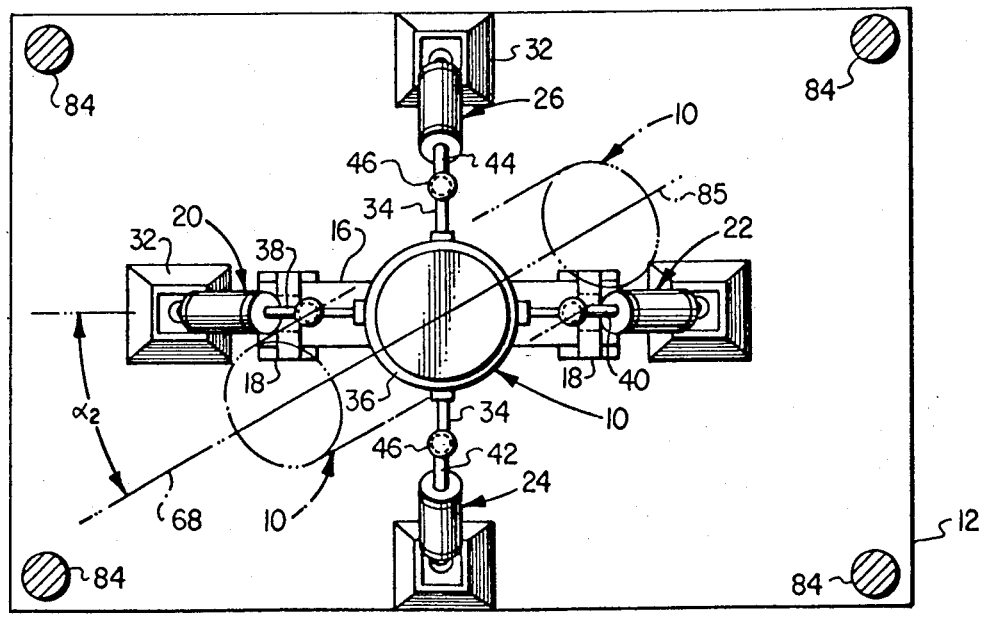
FIG. 2 is a simplified plan view of the apparatus of FIG. 1, with the axis of the hydraulic vibrator rotated into a vertical position.

Referring now to FIGS. 1 and 2, an apparatus for practicing of the invention utilizes a single vibrating mass as opposed to the dual or multiple vibratory masses described in the aforementioned U.S. Pat. No. 4,321,981 to Waters. In the FIGS. cylindrical vibrator assembly 10 will be understood to include all of the internal elements (not shown) which form necessary parts of a conventional seismic vibrator. These elements comprise a vibrating mass slideably mounted on a piston which is itself fixed to the outer housing 11. The mass is hydraulically reciprocated through a short stroke at varying frequencies. As the mass moves up and down, the reaction forces on the piston are coupled to base plate 12 in a manner to be more particularly described below, thus inducing seismic vibrations in the earth.

Assembly 10 is terminated at its lower end in a clevis 14, secured by means of pivot 15 to square horizontal shaft 16 which is, in turn, mounted for axial rotation between upright supports 18. The pivot axis of assembly 10 extends transverse to the axis of shaft 16 and parallel to the plane of base plate 12.

Adjustment of the vibratory axis of vibrator assembly 10 is accomplished by means of hydraulic cylinders 20, 22, 24 and 26, whose lower ends are secured to base plate 12 by means of like lower universal joints 30, formed within corresponding mounting brackets 32. At a point intermediate the upper and lower ends of assembly 10, spacer arms 34 extend radially from circumferential ring 36 fixed to external housing 11. The upper ends of piston rods 38, 40, 42 and 44, which are movable respectively within cylinders 20, 22, 24 and 26, are connected to spacer arms 34 by means of upper universal joints 46. By operating cylinders 20 and 22, in opposition or "push-pull" relation, one can tilt or pivot the axial path of assembly 10 in either sense about the horizontal axis through pivot 15. Similarly, "push-pull" operation of hydraulic cylinders 24 and 26 rotates assembly 10 about the other horizontal axis along shaft 16. The necessary freedom of motion of all four such hydraulic cylinders at their upper and lower ends is insured by universal joints 30 and 46. Thus, by operating both sets of cylinders, in tandem, one can align assembly 10 so that its slant path assumes any desired orientation with respect to the vertical directions and a given seismic line. For example, by respectively retracting and extending pistons 38 and 40, one can tilt assembly 10 counter clockwise so that its axis 68 lies at an angle $\alpha_1$ with respect to the vertical, as best seen in FIG. 1. If one additionally extends or retracts pistons 42 and 44 to the appropriate lengths, one can further rotate the axis 68 of assembly 10 to the dashed-line position shown in in the lower left hand quadrant of FIG. 2. In this position, axis 68 lies at an angle $\alpha_2$ with respect to the axis of shaft 16. The net effect of these two rotations of the vibratory axis 68 of assembly 10 can best be appreciated now by consideration of FIG. 3. In this FIG. 3, it is assumed for illustrative purposes, that base plate 12 is positioned on the earth and disposed such that the axis of shaft 16 lies along line 60, at right angles or transverse to seismic line 62 extending between seismic source point 64 and remotely positioned orthogonal geophones 66. Rotation of the vibratory axis 68 of vibrator assembly 10 through angles $\alpha_1$ and $\alpha_2$ as described above, places axis 68 in a vertical plane 70 at an oblique angle to seismic line 62. To insure good coupling to earth of the vibratory energy of assembly 10 the inner side walls of clevis 14 should preferably be flat surfaces in sliding contact with the corresponding plane faces of shaft 16. Similarly the extremities of shaft 16 should bear closely against supports 18. A vibratory impact against the earth of a single mass delivered along axis 68 in the manner described above permits the recording by means of orthogonal geophones 66 of any desired combination of P, SH and SV waves. To adjust the relative magnitudes of these waves one varies the magnitudes of angles $\alpha_1$ and $\alpha_2$. The received signal recordings may be rotated by computer to enhance and further identify SH and SV components, if desired. A vertical orientation of assembly 10 may be used for comparison with inclined impact to identify converted shear SV waves. If desired, without moving assembly 10 from seismic source point 64, one may, in the manner described, deliver two separate vibratory inputs to the earth, each at a different azimuth oblique to seismic line 62, in order to observe differences between SH and SV wave velocities. One can also, in this manner, adjust the azimuth angle $\alpha_2$ in response to changing dip orientation in the subsurface reflector.

Figure 3:
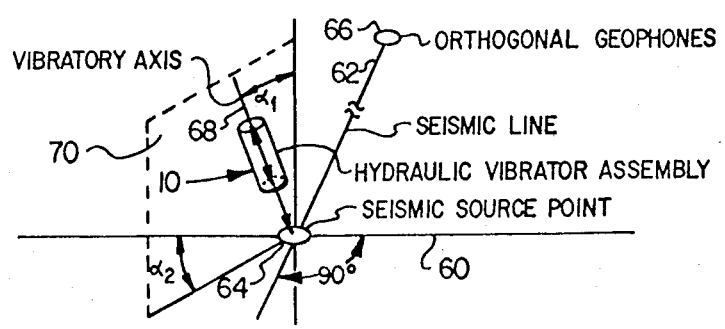
FIG. 3 is a schematic representation of the hydraulic vibrator of the apparatus of this invention, illustrating its axial orientation with respect to a seismic survey line.

If the angle $\alpha_1$, as illustrated in FIG. 3, is limited to near vertical, i.e., 5 degrees to not more than 25 degrees with respect to vertical, the amplitude of the resultant shear wave energy for some near surface ground conditions, is believed to retain very nearly the maximum value which can be achieved with a device of the character of assembly 10. The increased compression of the ground resulting from the near vertical impact increases shear stiffness and strength in the ground where those properties are deficient. If, in use, the frictional coupling between base plate 12 and the earth is broken by continued reciprocal motion of assembly 10, the underside of base plate 12 may be provided with inverted pyramidal cleats (not shown). Such coupling devices are well-known, as described, for example, in the U.S. Pat. No. 3,159,232 issued to D. W. Fair, on Dec. 1, 1964.

Frequency and sweep rate control of vibrator assembly 10 may be accomplished in a manner well known to those skilled in this art, utilizing hydraulic supply 76 and control valves 78. Servo valves 80 may then be operated by signals from sweep control 82 so as to provide reciprocation of the internal reaction mass within assembly 10 and corresponding vibratinal motion of assembly 10.

Base plate 12 is interconnected with any suitable transport vehicle 81 by means of adjustable sliding hydraulic support members 84. By extending supports 84, one can shift the weight of transport vehicle 81 in whole or in part from its normal spring suspension and tires so as to bear directly upon and stabilize base plate 12.

A further refinement of the operation of this invention comprises first orienting the vibratory axis of assembly 10 along axis 68 and thereafter rotating the axis of assembly 10 into a phase reversed axial position 85 as shown in phantom outline in FIG. 2, vibratory recording being obtained in both positions. The azimuth of axis 85 is rotated 180 degrees from that of axis 68 in FIGS. 1 and 2, while the slant path of axis 85 deviates from the vertical by the same angle as before but in a clockwise sense as shown in phantom in FIG. 1. Such a phase reversal between successive vibratory axes enables one to measure SV and SH wave energy along seismic line 62 in FIG. 3, in any desired proportion, free of either P wave energy or ground roll or other unwanted non-phase reversing propagations. By subtracting the wave amplitudes of one record from the other these non phase-reversing waves are cancelled out.

It should be understood that the particular form of vibrator described in this application, as well as the means for adjustment of the vibratory axis of the vibrator assembly 10 are illustrative only, and not to be regarded in any sense as limiting the scope of the method and apparatus of this invention, as more particularly set forth in the appended claims.

What is claimed is:

1. Apparatus for imparting seismic vibratory signals to the earth along a selected vector path comprising:
   (a) means for producing reciprocal vibrations along a given vibratory axis;
   (b) a ground-engaging base plate;
   (c) a shaft mounted upon said base plate in spaced parallel relation thereto, said shaft being rotatable about its longitudinal axis, said vibration means being pivotally interconnected with such shaft intermediate the ends thereof for rotation of said means about an axis transverse to the axis of said shaft; and
   (d) control means for rotation of said vibration means and said shaft about their respective axes of rotation, such that said vibratory axis coincides with said vector path.

2. Apparatus as in claim 1 wherein the rotation of said vibration means and said shaft are performed simultaneously.

3. Apparatus for imparting parting seismic vibratory signals to the earth along a selected vector path comprising:
   (a) means for producing reciprocal vibrations along a vibratory axis;
   (b) an earth engaging base plate;
   (c) a shaft mounted upon said base plate in spaced parallel relation thereto, said shaft being rotatable about its longitudinal axis, said vibration means being pivotally interconnected with said shaft intermediate the ends thereof for rotation of said vibration means about an axis transverse to the axis of said shaft;
   (d) first hydraulic means interconnected between said base plate and said vibration means for rotating said vibration means about its rotational axis through said shaft; and
   (e) second hydraulic means interconnected between said base plate and said vibration means for causing said vibration means to rotate about the longitudinal axis of said shaft, such combined rotations being adapted to bring the vibratory axis of said vibrating means into coincidence with said vector path.

* * * * *